(12) United States Patent
Chi

(10) Patent No.: US 9,692,341 B2
(45) Date of Patent: Jun. 27, 2017

(54) APPARATUS FOR DETECTING SPEED OF MOTOR

(71) Applicant: LSIS CO., LTD., Anyang-si, Gyeonggi-do (KR)

(72) Inventor: Min Hun Chi, Gunpo-si (KR)

(73) Assignee: LSIS CO., LTD., Anyang-si (KR)

( * ) Notice: Subject to any disclaimer, the term of this patent is extended or adjusted under 35 U.S.C. 154(b) by 0 days.

(21) Appl. No.: 14/639,811

(22) Filed: Mar. 5, 2015

(65) Prior Publication Data

US 2015/0263659 A1 Sep. 17, 2015

(30) Foreign Application Priority Data

Mar. 13, 2014 (KR) .................. 10-2014-0029750

(51) Int. Cl.
| | | |
|---|---|---|
| G05B 19/29 | (2006.01) | |
| H02P 23/00 | (2016.01) | |
| G01P 3/481 | (2006.01) | |
| G01P 3/489 | (2006.01) | |
| H02P 23/22 | (2016.01) | |
| G01D 5/245 | (2006.01) | |

(52) U.S. Cl.
CPC .......... *H02P 23/0068* (2013.01); *G01P 3/481* (2013.01); *G01P 3/489* (2013.01); *H02P 23/22* (2016.02); *G01D 5/2451* (2013.01)

(58) Field of Classification Search
CPC .............................. G05B 19/291; H02M 1/00
USPC .......................................... 318/60, 602, 603
See application file for complete search history.

(56) References Cited

U.S. PATENT DOCUMENTS

| | | | | |
|---|---|---|---|---|
| 4,954,905 | A * | 9/1990 | Wakabashi | ........... G11B 5/5547 360/77.03 |
| 4,998,105 | A * | 3/1991 | Takekoshi | ............... H03M 1/24 250/231.16 |
| 5,019,773 | A | 5/1991 | Sugiura et al. | |
| 5,721,546 | A * | 2/1998 | Tsutsumishita | .... G01D 5/24409 341/116 |

(Continued)

FOREIGN PATENT DOCUMENTS

| | | |
|---|---|---|
| JP | 05-052589 | 3/1993 |
| JP | 07-229757 | 8/1995 |

(Continued)

OTHER PUBLICATIONS

Computer generated translation of Japanese document 2009-198231 dated Nov. 21, 2016, 5 pages.*

(Continued)

*Primary Examiner* — Rina Duda
(74) *Attorney, Agent, or Firm* — Lee, Hong, Degerman, Kang & Waimey

(57) ABSTRACT

An apparatus for detecting speed of a motor is disclosed, the apparatus including an amplifier configured to amplify a two-phase sine-wave signal inputted from an encoder based on rotation of a motor; a first conversion unit configured to convert the two-phase sine-wave signal to a digital data; a second conversion unit configured to convert the two-phase sine-wave signal to a square-wave signal; a counter unit configured to accumulate by counting the square-wave signal; and a speed determination unit configured to determine a speed of the motor, by receiving the digital data from the first conversion unit and the accumulated count from the counter unit.

1 Claim, 3 Drawing Sheets

(56) References Cited

U.S. PATENT DOCUMENTS

| | | | | |
|---|---|---|---|---|
| 6,037,735 A * | 3/2000 | Janosky | ............... | G05B 19/404 |
| | | | | 318/592 |
| 6,084,376 A * | 7/2000 | Piedl | .................... | G01D 5/2073 |
| | | | | 318/254.2 |
| 6,091,216 A * | 7/2000 | Takahashi | ............... | H02P 6/085 |
| | | | | 318/400.09 |
| 6,525,502 B1 * | 2/2003 | Piedl | ..................... | H03M 1/485 |
| | | | | 318/600 |
| 6,956,505 B2 * | 10/2005 | Taniguchi | ........... | H03M 1/1038 |
| | | | | 341/11 |
| 2005/0090998 A1 * | 4/2005 | Atsuta | ................ | G01D 5/24409 |
| | | | | 702/117 |
| 2013/0026965 A1 * | 1/2013 | Yoshitake | .......... | G01D 5/24476 |
| | | | | 318/638 |

FOREIGN PATENT DOCUMENTS

| | | |
|---|---|---|
| JP | H10190458 | 7/1998 |
| JP | 2003273736 | 9/2003 |
| JP | 2009-198231 | 9/2009 |

OTHER PUBLICATIONS

European Patent Office Application Serial No. 15158033.9, Search Report dated Jul. 17, 2015, 7 pages.
Korean Intellectual Property Office Application Serial No. 10-2014-0029750, Office Action dated Jan. 14, 2015, 8 pages.
Japan Patent Office Application Serial No. 2015-050749, Office Action dated Mar. 15, 2016, 5 pages.
Japan Patent Office Application Serial No. 2015-050749, Office Action dated Oct. 11, 2016, 5 pages.

* cited by examiner

APPARATUS FOR DETECTING SPEED OF MOTOR

CROSS REFERENCE TO RELATED APPLICATIONS

Pursuant to 35 U.S.C. §119(a), this application claims the benefit of earlier filing date and right of priority to Korean Patent Application No. 10-2014-0029750, filed on Mar. 13, 2014, the contents of which are hereby incorporated by reference herein in its entirety.

BACKGROUND

Field of the Disclosure

The present disclosure relates to an apparatus for detecting speed of a motor.

Discussion of the Related Art

In general, as variable speed drives of AC (alternating current) motors by inverters are widely used, speed of the motors are detected by attaching a speed detection sensor to the motor, when accurate speed control of the motors is required.

Incremental encoders are commonly used as such speed detection sensors. The incremental encoders may be widely divided into encoders to output square-wave signals and encoders to output sine-wave signals.

Among them, the encoder outputting a sine-wave signal (hereinafter referred to as 'sine-wave encoder') outputs a two-phase sine-wave having a predetermined number of ninety-degree phase differences between each other per rotation of a motor. Thus, the sine-wave encoder detects a speed of a motor, by measuring the sine-wave using a speed detecting device provided in an inverter, at every predetermined interval.

However, when detecting a speed of a motor by using a conventional sine-wave encoder, because a high frequency signal is used, there occurs a problem that accuracy of the detected speeds is declined when the speed of the motor is increased.

SUMMARY OF THE DISCLOSURE

A technical challenge that the present disclosure intends to achieve is, to provide an apparatus to accurately detect a speed of a motor, by detecting an output signal of a sine-wave encoder.

In a general aspect of the present disclosure, there is provided an apparatus for detecting speed of a motor, the apparatus comprising: an amplifier configured to amplify a two-phase sine-wave signal inputted from an encoder based on rotation of a motor; a first conversion unit configured to convert the two-phase sine-wave signal to a digital data; a second conversion unit configured to convert the two-phase sine-wave signal to a square-wave signal; a counter unit configured to accumulate by counting the square-wave signal; and a speed determination unit configured to determine a speed of the motor, by receiving the digital data from the first conversion unit and the accumulated count from the counter unit.

In some exemplary embodiment of the present disclosure, the first conversion unit may convert the two-phase sine wave signal to the digital data by a predetermined number of bits.

In some exemplary embodiment of the preset disclosure, the speed determination unit may include: a first determination unit configured to determine a position angle in a pulse, by using the digital data; a second determination unit configured to determine a position angle with respect to a single rotation of the motor, by combining the position angle in a pulse and the accumulated count received from the counter unit; and a third determination unit configured to determine a speed of the motor, based on a change in position of the motor.

In some exemplary embodiment of the preset disclosure, the third determination unit may determine a speed of the motor, by dividing the change in position of the motor by a change in time.

The apparatus according to an exemplary embodiment of the present disclosure can generate a position angle with high resolution by using a value arc-tangent calculating each of a sine signal and cosine signal by a cycle and a value counted by conversion to a square-wave signal, therefore, has an advantageous effect of being capable of more accurate speed calculation.

DETAILED DESCRIPTION

Various exemplary embodiments will be described more fully hereinafter with reference to the accompanying drawings, in which some exemplary embodiments are shown. The present inventive concept may, however, be embodied in many different forms and should not be construed as limited to the exemplary embodiments set forth herein. Rather, the described aspect is intended to embrace all such alterations, modifications, variations, and equivalents that fall within the scope and novel idea of the present disclosure.

Hereinafter, referring to enclosed figures, an exemplary embodiment of the present disclosure will be described in detail, after describing a conventional apparatus for detecting speed of a motor.

Figure 1:
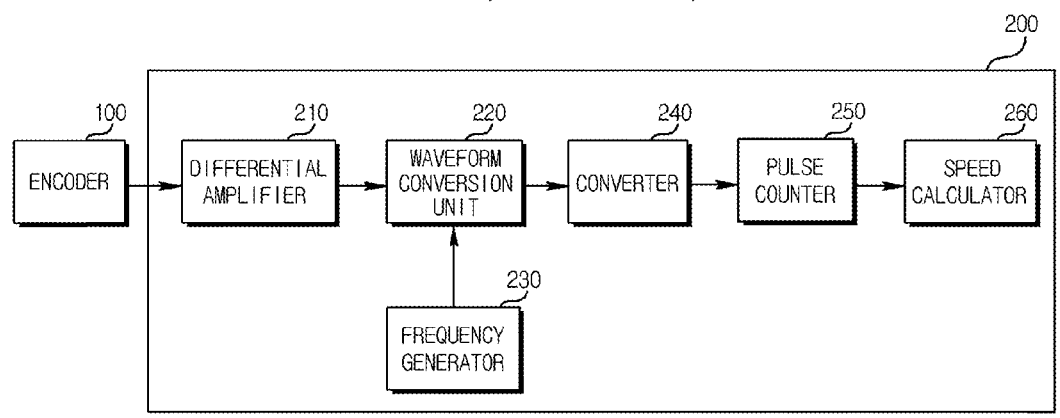
FIG. 1 is a block diagram of a diagram illustrating an apparatus for detecting speed of a motor using a signal outputted from a sine-wave encoder according to prior art.
Figure 2:
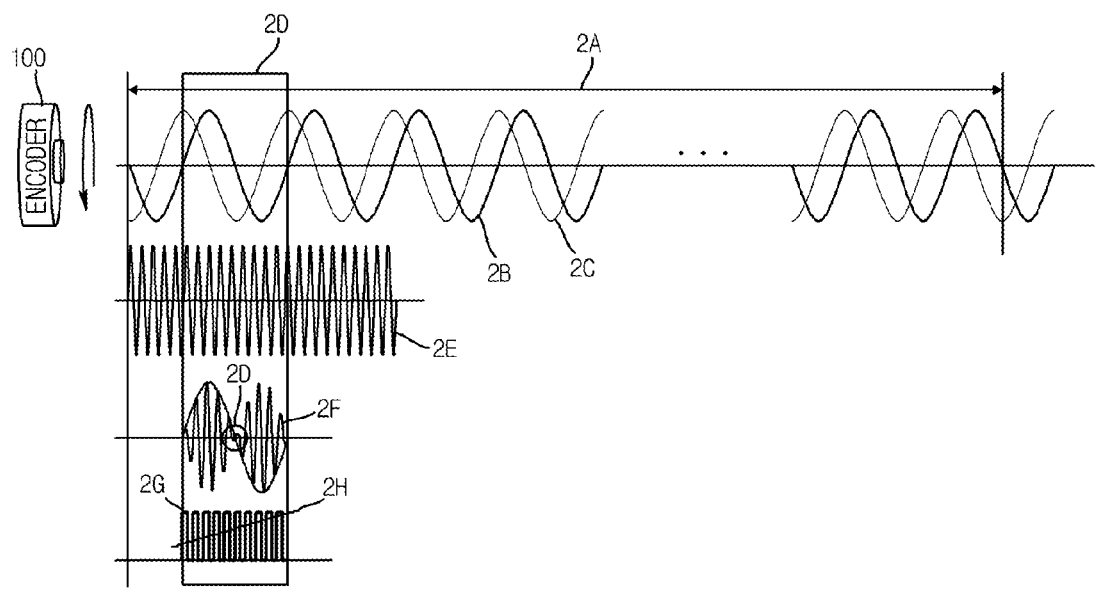
FIG. 2 is a waveform diagram illustrating the output signal of FIG. 1.

FIG. 1 is a block diagram of a diagram illustrating an apparatus for detecting speed of a motor using a signal outputted from a sine-wave encoder according to prior art, and FIG. 2 is a waveform diagram illustrating the output signal from the apparatus illustrated in FIG. 1.

A conventional apparatus for detecting a speed of a motor is formed by including an encoder (100), by being attached to an axis of a motor (not illustrated in the figure), to generate a predetermined number of two-phase sine-wave signals (sine and cosine signals) having degree phase differences between each other per rotation of a motor, and a speed detection device (200).

The speed detection device (200) is formed by including a differential amplifier (210) to amplify by differentiating sine and cosine signals of the sine-wave encoder (100), a waveform conversion unit (220) to combine the differentially amplified sine and cosine signals with high frequency signals provided by a frequency generator (230), a converter (240) to convert the waveform-converted sine and cosine signals to pulse signals, a pulse counter (250) to count the pulse signals, and a speed calculator (260) to detect a speed by calculating change amount of the outputted counts at every predetermined interval.

Referring to FIG. 2, 2A represents a single rotation of a motor, while 2B and 2C represent a sine signal and a cosine signal, respectively. The sine signal (2B) and the cosine signal (2C) have a ninety-degree phase difference. 2D represents a cycle of the sine (2B) and cosine (2C) signals. 2E represents a high frequency signal generated by a frequency generator (230). In addition, 2F is a signal which the waveform conversion unit (220) generates by combining a differential signal of the sine (2B) and cosine (2c) signals with a high frequency signal (2E) of the frequency generator (230). 2G is a pulse signal converted by the converter (240). In addition, 2H represents a signal accumulating the pulse signal (2G) by the pulse counter (250).

Hereinafter, operations of the apparatus illustrated in FIG. 1 will be described.

At first, the sine-wave encoder (100) attached to an axis of a motor (not illustrated in the figure) is a position sensor to output as many sine-waves as change in position of the axis due to rotation of the motor. Since the number of output signals per rotation of the motor is predetermined, the change amount in rotational position can be figured out by the number of outputted sine-waves.

While output signals of the sine-wave encoder (100) are stable in size, the frequency may be variable by rotation speed of the motor.

The differential amplifier (210) is for insulation and level control of output signals of the sine-wave encoder (100). The differential amplifier (210) amplifies the signals outputted from the encoder (100) such as 2B and 2C based on a predetermined gain, by differentiating the signals from the encoder (100).

The frequency generator (230) generates a signal of predetermined size and frequency such as 2E, and provides the signal for the waveform conversion unit (220). The waveform conversion unit (220) combines a high frequency signal with the differentially amplified signal and outputs the combined signal with 2F. Here, the reason of combining these two signals is to enhance resolution of the differential signal.

For example, in a case where the sine signal (2B) and the cosine signal (2C) are 100 Hz, when a high frequency signal of 10 kHz is combined with these signals, 100 times of sine-waves are generated in a cycle of the 100 Hz. That is, while the original number of output signals of the sine-wave encoder (100) is predetermined per rotation of the motor, the number of output signals generated during a single rotation may be multiplied by several times by combining a high frequency signal with the output signals.

Thereby the waveform conversion unit (220) may increase the number of signals generated during a single rotation, by combining a high frequency signal (2E) generated by the frequency generator (230) with the differentially amplified signals.

The converter (240) converts the sine-wave signal (2F) combined by the waveform conversion unit (220) to a square-wave signal (2G). The pulse counter (250) accumulates a count every time when the square-wave signal (2G) changes from a lower level to an upper level, or changes from an upper level to a lower level.

Thereafter, the speed calculator (260) calculates a speed of the motor at every predetermined interval, by using a pulse (2H) counted by the generation due to rotation of the motor. Here, the speed calculator (260) calculates the motor speed by using the following equation.

$$\text{speed} = \frac{\text{change amount in position}}{\text{change amount in time}}. \qquad \text{[Equation 1]}$$

However, the conventional apparatus for detecting speed as described in the above has a problem that variance of the detected speed increases above a certain speed, due to limitation of frequency range which the waveform conversion unit (220) can process.

That is, the differentially amplified signal may be stable in size, but may changes the signal frequency when driving speed of the motor changes. When the motor drives above a certain speed, frequency of the differentially amplified signal may increase, and due to limitation of frequency range which the waveform conversion unit (220) can process, there may occur a problem that the signal converted by being combined with the signal of the frequency generator (230) is not generated partially. Especially, this problem occurs in the area corresponding to 2D in FIG. 2.

In a case where the output signal (2F) of the waveform conversion unit (220) is not accurate, the pulse signal converted by the converter becomes inaccurate; thereby the accuracy of counting by the pulse counter (250) is declined. As a result, there occurs a problem that the calculation of the motor speed by the speed calculator (260) becomes inaccurate.

In order to solve out the abovementioned problem, the present disclosure provides an apparatus which can accurately detect the speed even when the motor drives in a high speed above a certain speed.

Figure 3:
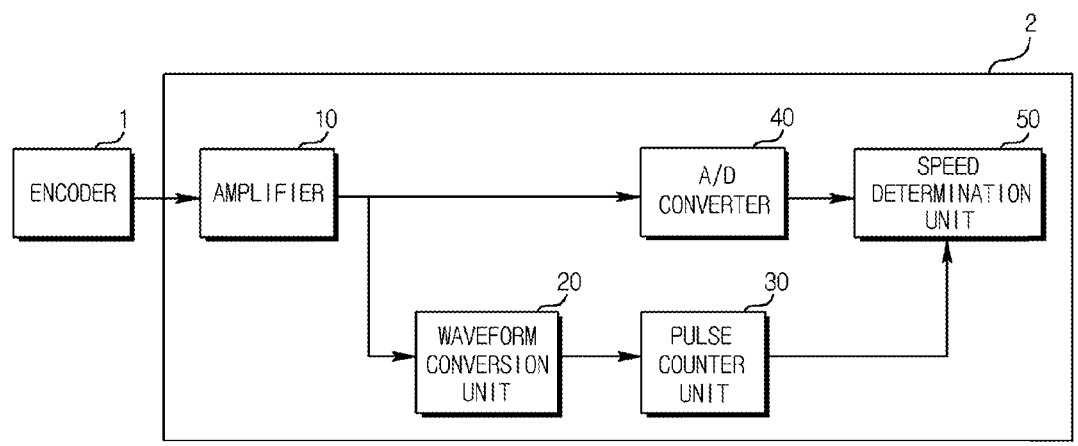
FIG. 3 is a block diagram illustrating an apparatus for detecting speed of a motor according to an exemplary embodiment of the present disclosure.
Figure 4:
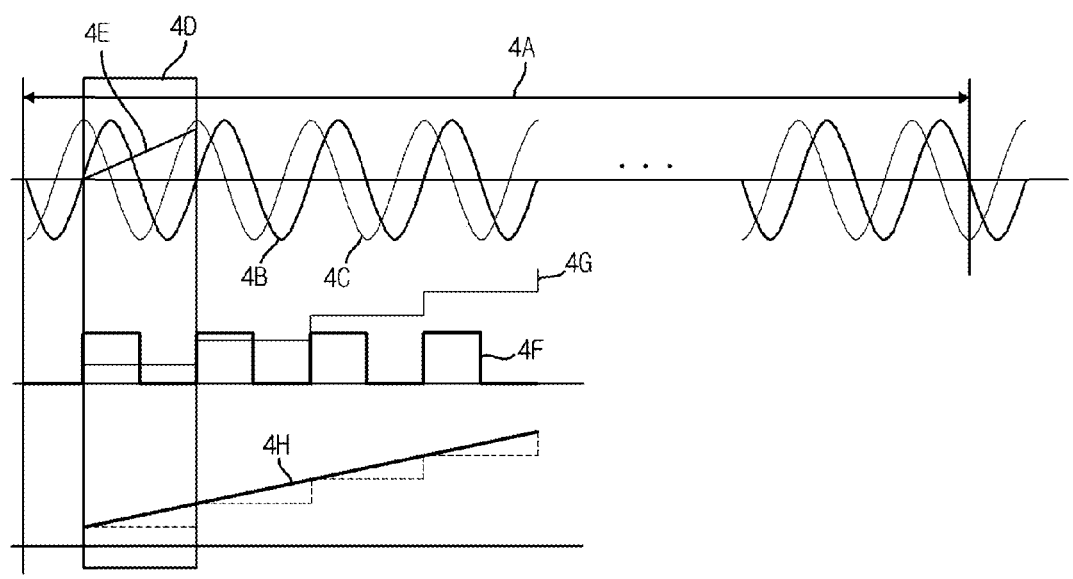
FIG. 4 is an exemplary view illustrating the output signal of FIG. 3.

FIG. 3 is a block diagram illustrating an apparatus for detecting speed of a motor according to an exemplary embodiment of the present disclosure, and FIG. 4 is an exemplary view illustrating the output signal of FIG. 3.

As illustrated in FIG. 3, the apparatus for detecting speed of a motor (2) according to an exemplary embodiment of the present disclosure may include an amplifier (10), a waveform conversion unit (20), a pulse counter unit (30), an A/D (Analog/Digital) converter unit (40), and a speed determination unit (50).

The apparatus for detecting speed of a motor (2) according to an exemplary embodiment of the present disclosure may determine a rotation speed of a motor, by receiving two-phase sine-wave signals (sine and cosine signals) having degree phase differences between each other generated by a predetermined number per rotation of the motor, from an encoder (100) attached to an axis of the motor (not illustrated in the figure), and by using the two-phase sine-wave signals.

The amplifier (10) may amplify the level of the sine and cosine signals outputted from the sine-wave encoder (1) and may output the amplified signals. The amplifier (10) may be, for example, a differential amplifier.

The waveform conversion unit (20) may convert any one of the amplified sine and cosine signals to a square-wave signal. The pulse counter unit (30) may count the square-wave signal converted by the waveform conversion unit (20).

In addition, the A/D converter unit (40) may convert the amplified sine and cosine signals to digital data. The A/D converter unit, for example, may convert the sine and cosine signals to the digital data by a predetermined number of bits.

Thereby, the resolution of the apparatus for detecting speed (2) may be enhanced as the bit number of the A/D converter unit increases.

The speed determination unit (50) may determine a speed of the motor by receiving outputs from the pulse counter unit (30) and the A/D converter unit (40).

Referring to FIG. 4, 4A represents a number of signals outputted by the encoder (1) during a single rotation of a motor, while 4B and 4C represent a sine signal and a cosine signal outputted by the encoder (1), respectively. In addition, 4D represents a cycle of the sine signal (4B) and the cosine signal (4C). 4E represents a position angle of a square-wave cycle generated by arc-tangent-calculating the sine signal (4B) and the cosine signal (4C).

In addition, 4F is a signal which the waveform conversion unit (20) converts the signal amplified by the amplifier (10) to a square-wave signal. 4G represents a count which the pulse counter unit (30) accumulates the square-wave signals (4F).

In addition, 4H represents a position angle with respect to a single motor rotation, generated by combination of the accumulated count (4G) by the pulse counter unit (30), and the position angle (4E) of a square-wave cycle.

Figure 5:
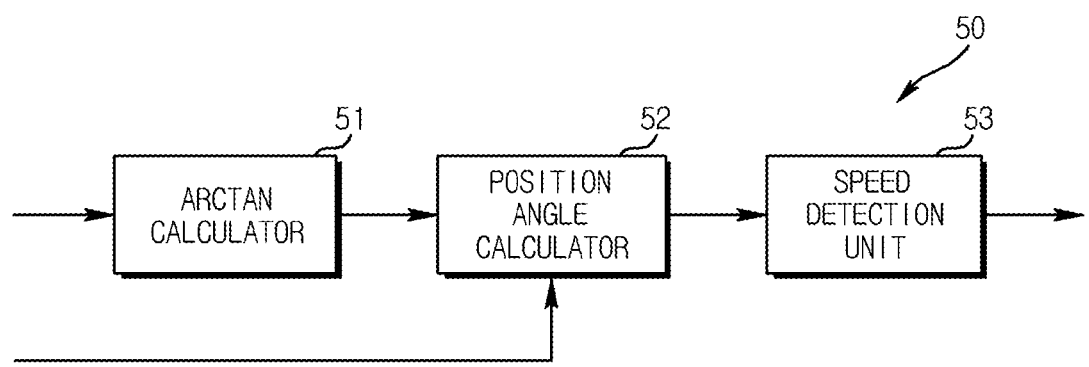
FIG. 5 is a detailed block diagram illustrating a speed determination unit of FIG. 4.

FIG. 5 is a detailed block diagram illustrating a speed determination unit (50), in order to describe the process where the speed determination unit (50) according to an exemplary embodiment of the present disclosure determines a speed of the motor.

As illustrated in FIG. 5, the speed determination unit (50) according to an exemplary embodiment of the present disclosure may include an arc-tangent calculator (51), a position angle calculator (51), and a speed detection unit (53).

The arc-tangent calculator (51) may determine a position angle in a pulse of the encoder (1) by using the sine and cosine data received from the A/D converter unit (40).

That is, $$\tan\theta = \frac{\sin\theta}{\cos\theta}.$$

Therefore, the θ may be determined by an arc-tangent calculation. The result of this calculation corresponds to 4E in FIG. 4.

The position angle calculator (52) may determine a position angle (4H) with respect to a single motor rotation, by combining the position angle (4E) in a pulse received from the arc-tangent calculator (51) and the accumulated count (4G) received from the pulse counter unit (30).

The speed detection unit (53) may detect a speed of the motor, by calculating the proportion of change amount in position to change amount in time at every predetermined interval, on the basis of the position angle (4H) with respect to a single motor rotation calculated by the position angle calculator (52).

Hereinafter, overall operations of the apparatus for detecting speed (2) illustrated in FIG. 3 will be described.

At first, the encoder (1) attached to an axis of the motor is a position sensor to output as many sine-waves as change in position of the axis due to rotation of the motor. Since the number of output signals per rotation of the motor (4A) is predetermined, the change amount in rotational position can be figured out by the number of outputted sine-waves.

The amplifier (10) of the apparatus for detecting speed (2) according to an exemplary embodiment of the present disclosure may insulate and amplify the sine and cosine signals outputted from the encoder (1), and may output the amplified signals (4B, 4C). The gain of the amplifier may be changed by the user setting.

Thereafter, two kinds of signal processing may be performed on the sine and cosine signals (4B, 4C) amplified and received from the encoder (1) according to an exemplary embodiment of the present disclosure, in order to generate a position angle.

At first, a position angle (4E) in a pulse cycle may be figured out, by converting the sine and cosine signals (4B, 4C) to digital data and by arc-tangent calculating the digital data. And a position angle (4H) with respect to a single motor rotation may be generated, by converting the sine and cosine signals (4B, 4C) to a square-wave signal (4F) and by pulse-counting the square-wave signal (4F). That is, the position angle (4H) with respect to a single motor rotation may be confirmed, by aggregating the position angle (4G) accumulated by the pulse counter unit (30) with a position angle change (4E) in a cycle by the arc-tangent calculation.

Thereafter, the speed of motor may be detected, by calculating the change amount in position of the motor at every predetermined interval, on the basis of the position angle (4H).

Thereby, the apparatus for detecting speed (2) according to an exemplary embodiment of the present disclosure may generate a position angle with high resolution by using a value arc-tangent calculating each of a sine signal and cosine signal by a cycle and a value counted by conversion to a square-wave signal, and may perform an accurate speed calculation based on the position angle.

That is, the apparatus for detecting speed (2) according to an exemplary embodiment of the present disclosure may remove a phenomenon where variance of the detected speed increases above a certain speed, and may perform a precise speed control by the position angle with high resolution.

The abovementioned exemplary embodiments are intended to be illustrative, and not to limit the scope of the claims. Many alternatives, modifications, variations, and equivalents will be apparent to those skilled in the art. The features, structures, methods, and other characteristics of the exemplary embodiments described herein may be combined in various ways to obtain additional and/or alternative exemplary embodiments. Therefore, the technical scope of the rights for the present disclosure shall be decided by the claims.

REFERENCE NUMERALS 10 amplifier
20 wavelength conversion unit
30 pulse counter
40 A/D converter unit
50 speed determination unit

What is claimed is:

1. An apparatus for determining speed of a motor, the apparatus comprising:
   an amplifier configured to amplify a two-phase sine-wave signal input from an encoder based on rotation of the motor;
   a first conversion unit configured to convert the amplified two-phase sine-wave signal to a digital data according to a predetermined number of bits;
   a second conversion unit configured to convert the amplified two-phase sine-wave signal to a square-wave signal;

a counter unit configured to count the square-wave signal; and
a speed determination unit configured to determine the speed of the motor by receiving the digital data from the first conversion unit and a count from the counter unit,
wherein resolution of the determined speed is enhanced as the predetermined number of bits increases, and
wherein the speed determination unit comprises:
a first determination unit configured to use the digital data to determine a position angle in a pulse;
a second determination unit configured to determine a position angle with respect to a single rotation of the motor by combining the determined position angle from the first determination unit and the count from the counter unit; and
a third determination unit configured to determine the speed of the motor based on a change in position of the motor by dividing the change in position by a change in time.

* * * * *